United States Patent
Pan et al.

(10) Patent No.: US 7,792,077 B2
(45) Date of Patent: Sep. 7, 2010

(54) WIRELESS COMMUNICATION METHOD AND APPARATUS FOR PROCESSING ENHANCED UPLINK SCHEDULING GRANTS

(75) Inventors: Jung-Lin Pan, Smithtown, NY (US); Stephen E. Terry, Northport, NY (US); Guodong Zhang, Syosset, NY (US); Peter S. Wang, E. Setauket, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 12/570,005

(22) Filed: Sep. 30, 2009

(65) Prior Publication Data

US 2010/0023833 A1    Jan. 28, 2010

Related U.S. Application Data

(63) Continuation of application No. 11/477,279, filed on Jun. 29, 2006, now Pat. No. 7,163,157.

(60) Provisional application No. 60/712,307, filed on Aug. 30, 2005.

(51) Int. Cl.
*H04W 4/00* (2009.01)

(52) U.S. Cl. .................. 370/329; 370/341; 370/310; 370/277; 370/328; 370/338

(58) Field of Classification Search ............... 370/341, 370/329, 310, 277, 331, 348, 310.2, 328, 370/338, 335

See application file for complete search history.

(56) References Cited

U.S. PATENT DOCUMENTS

| 7,496,075 | B2 * | 2/2009 | Kwak et al. ............ 370/335 |
| 7,596,122 | B2 | 9/2009 | Han et al. |
| 2002/0065081 | A1 | 5/2002 | Barany et al. |
| 2004/0160936 | A1 | 8/2004 | Liu et al. |
| 2004/0209620 | A1 | 10/2004 | Gaal et al. |
| 2005/0041588 | A1 | 2/2005 | Kim et al. |

(Continued)

OTHER PUBLICATIONS

Third Generation Partnership Project, *Technical Specification Group Radio Access Network; Medium Access Control (MAC) Protocol Specification*, Release 6, 3GPP TS 25.321, V6.5.0, (Jun. 2005).

(Continued)

*Primary Examiner*—Huy Phan
(74) *Attorney, Agent, or Firm*—Volpe and Koenig, P.C.

(57) ABSTRACT

A method for generating a serving grant at a wireless transmit/receive unit is disclosed. An absolute grant channel signal is decoded to obtain an absolute grant from a serving cell. A relative grant channel signal is decoded to obtain a relative grant from a serving radio link set and a relative grant from a non-serving radio link. A first serving grant candidate is generated based on the absolute grant from the serving cell or the relative grant from the serving radio link set. A second serving grant candidate is generated based on the relative grant from the non-serving radio link. The serving grant is generated based on the first serving grant candidate and the second serving grant candidate.

17 Claims, 8 Drawing Sheets

U.S. PATENT DOCUMENTS

| | | |
|---|---|---|
| 2005/0220042 A1 | 10/2005 | Chang et al. |
| 2006/0056355 A1 | 3/2006 | Love et al. |
| 2006/0104240 A1 | 5/2006 | Sebire et al. |
| 2006/0114877 A1 | 6/2006 | Heo et al. |
| 2006/0159016 A1 | 7/2006 | Sagfors et al. |
| 2006/0215604 A1 | 9/2006 | Mueckenheim |
| 2007/0042784 A1 | 2/2007 | Anderson |
| 2007/0047452 A1 | 3/2007 | Lohr et al. |
| 2008/0070583 A1* | 3/2008 | Tseng et al. ............... 455/450 |
| 2008/0089296 A1* | 4/2008 | Kazmi et al. ............... 370/336 |
| 2008/0253300 A1 | 10/2008 | Wakabayashi et al. |
| 2009/0034487 A1 | 2/2009 | Lohr et al. |
| 2009/0143071 A1 | 6/2009 | Bergstrom |

OTHER PUBLICATIONS

Third Generation Partnership Project, *Technical Specification Group Radio Access Network; Medium Access Control (MAC) Protocol Specification*, Release 6, 3GPP TS 25.321, V6.9.0, (Jun. 2006).

Third Generation Partnership Project, *Technical Specification Group Radio Access Network; Medium Access Control (MAC) Protocol Specification*, Release 7, 3GPP TS 25.321, V7.1.0, (Jun. 2006).

Third Generation Partnership Project, *Technical Specification Group Radio Access Network; Medium Access Control (MAC) Protocol Specification*, Release 6, 3GPP TS 25.321, V6.5.0, (Jun. 2005).

Third Generation Partnership Project, *Technical Specification Group Radio Access Network; Medium Access Control (MAC)Protocol Specification*, Release 6, 3GPP TS 25.321, V6.9.0, (Jun. 2006).

Third Generation Partnership Project, *Technical Specification Group Radio Access Network; Medium Access Control (MAC) Protocol Specification*, Release 7, 3GPP TS 25.321, V7.1.0, (Jun. 2006).

* cited by examiner

WIRELESS COMMUNICATION METHOD AND APPARATUS FOR PROCESSING ENHANCED UPLINK SCHEDULING GRANTS

CROSS REFERENCE TO RELATED APPLICATIONS

This application is a continuation of U.S. patent application Ser. No. 11/477,279, filed Jun. 29, 2006, which claims the benefit of U.S. Provisional Patent Application No. 60/712,307, filed Aug. 30, 2005, which is incorporated by reference as if fully set forth.

FIELD OF INVENTION

The present invention is related to a wireless communication system. More particularly, the present invention is related to a method and apparatus for processing enhanced uplink (EU) scheduling grants.

BACKGROUND

EU is one of the major features in the third generation partnership project (3GPP) system. EU offers a peak data rate of 5.76 Mbps. In order to support EU operation, several downlink physical channels, such as an enhanced dedicated channel (E-DCH) absolute grant channel (E-AGCH) and an E-DCH relative grant channel (E-RGCH), are provided to transmit control information.

Figure 1:
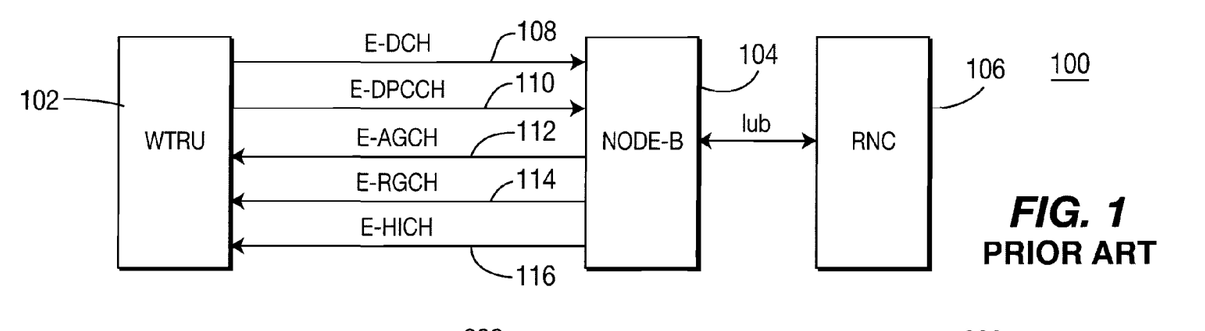
FIG. 1 is a block diagram of a conventional wireless communication system.

FIG. 1 is a block diagram of a conventional wireless communication system 100 which supports EU. The system 100 comprises a wireless transmit/receive unit (WTRU) 102, a Node-B 104 and an RNC 106. The RNC 106 controls overall E-DCH operation by configuring E-DCH parameters for the Node-B 104 and the WTRU 102, such as initial transmit power level, maximum allowed transmit power or power ratio, or available channel resources per Node-B. Between the WTRU 102 and the Node-B 104, an E-DCH 108, an E-DCH dedicated physical control channel (E-DPCCH), an E-AGCH 112, an E-RGCH 114 and an E-DCH hybrid automatic repeat request (H-ARQ) indicator channel (E-HICH) 116 are established for supporting E-DCH operations.

For E-DCH transmissions, the WTRU 102 sends scheduling requests, (also known as rate requests), for the logical channels which a radio resource control (RRC) determines that reporting is needed to be made to the Node-B 104 via the E-DCH 108. The scheduling requests are transmitted in the form of scheduling information and a happy bit. The happy bit is transmitted via the E-DPCCH 110 whenever the E-DPCCH 110 is transmitted. The Node-B 104 sends a scheduling grant (i.e., an absolute grant (AG) or a relative grant (RG)) to the WTRU 102 via the E-AGCH 112 or the E-RGCH 114. The AG is sent by an E-DCH serving cell, and the RG is sent by either an E-DCH serving radio link set (RLS) or an E-DCH non-serving radio link (RL). The E-DCH serving cell is a cell from which the WTRU receives AGs from a Node-B scheduler. A WTRU has one E-DCH serving cell. The E-DCH serving RLS is a set of cells which contains at least the E-DCH serving cell and from which the WTRU shall receive an AG. The WTRU has only one serving RLS. The non-serving RL is a cell which belongs to the E-DCH active set but does not belong to the serving RLS and from which the WTRU may receive an RG. The WTRU may have zero, one or several non-serving RL(s).

After E-DCH radio resources are allocated for the WTRU 102, the WTRU 102 transmits uplink data via the E-DCH 108. In response to E-DCH or E-DPCCH transmissions, the Node-B 104 sends an acknowledgement (ACK) or a non-acknowledgement (NACK) message for H-ARQ operation via the E-HICH 116.

The E-AGCH 112 carries an AG which includes an AG value and an activation flag. The AG value is provided in the form of a maximum power ratio for the WTRU. The maximum power ratio is given by the ratio of E-DCH dedicated physical data channel (E-DPDCH) over dedicated physical control channel (DPCCH) power. The activation flag is used to activate or deactivate the H-ARQ processes. The activation flag may be set to either "SINGLE" or "ALL." If the activation flag is set to "SINGLE", a single H-ARQ process is activated or deactivated. If the activation flag is set to "ALL", all H-ARQ processes are activated or deactivated.

The E-RGCH 114 carries an RG. The RG indicates power (or power ratio) up or down commands to adjust the absolute grant. The serving RLS may send UP, DOWN or HOLD commands and the non-serving RL may send DOWN or HOLD commands. The UP, DOWN or HOLD commands indicate an increase, decrease or no change of the maximum allowed power ratio of the WTRU for the scheduled transmission of data, respectively. The commands from different non-serving RLs are independent and may be different from one another. The E-DCH non-serving RLs send the RG to prevent system overloading in data traffic and maintain the intra-cell and inter-cell interference at the required level.

A network may control single WTRU or a group of WTRUs via the E-AGCH, the E-RGCH, or both. When in a primary AG mode, the Node-B controls the resource scheduling for only a particular WTRU via the E-AGCH. When in a secondary AG mode, the Node-B controls the resource scheduling for a group of WTRUs via the E-AGCH. The E-AGCH is transmitted with an E-DCH radio network temporary identifier (E-RNTI). Two E-RNTIs may be configured for the WTRU at a time. One is a primary E-RNTI and the other is a secondary E-RNTI. Only one E-RNTI may be transmitted in the air at a time. The WTRU should monitor both E-RNTIs if the WTRU is configured with both E-RNTIs.

The WTRU calculates and sets a serving grant (SG) based on the received AG and RG. A successful detection and decoding of the E-AGCH 112 and the E-RGCH 114 and proper setting of the SG are important for the performance of systems and the performance of EU. Therefore, it is desirable to have a method and apparatus for efficiently detecting and decoding the AG and RGs and processing the SG.

SUMMARY

The present invention is related to a method and apparatus for processing EU scheduling grants. A WTRU detects a scheduling grant including at least one of an AG or an RG. Once the WTRU detects an AG or an RG, a new SG is generated and an H-ARQ process may be activated or deactivated depending on whether the received AG is a primary AG or a secondary AG, whether a scheduling mode is a primary AG mode or a secondary AG mode, whether an AG value is set to "INACTIVE" and whether a transmission time interval (TTI) is 2 ms or 10 ms. A Node-B may send either a primary AG or a secondary AG to a WTRU.

BRIEF DESCRIPTION OF THE DRAWINGS

A more detailed understanding of the invention may be had from the following description, given by way of example and to be understood in conjunction with the accompanying drawings wherein.

DETAILED DESCRIPTION OF THE PREFERRED EMBODIMENTS

When referred to hereafter, the terminology "WTRU" includes but is not limited to a user equipment (UE), a mobile station, a fixed or mobile subscriber unit, a pager, or any other type of device capable of operating in a wireless environment. When referred to hereafter, the terminology "Node-B" includes but is not limited to a base station, a site controller, an access point (AP) or any other type of interfacing device in a wireless environment.

The features of the present invention may be incorporated into an integrated circuit (IC) or be configured in a circuit comprising a multitude of interconnecting components.

Figure 2:
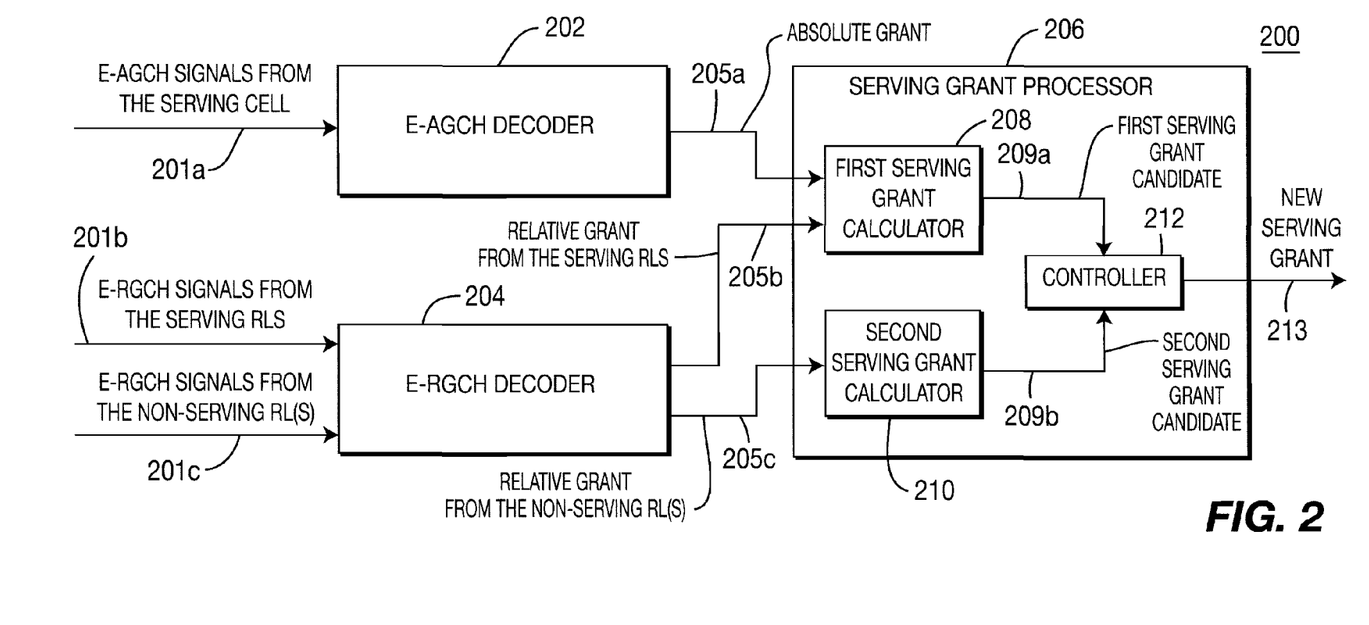
FIG. 2 is an exemplary block diagram of a WTRU configured in accordance with the present invention.

FIG. 2 is an exemplary block diagram of a WTRU 200 configured in accordance with the present invention. The WTRU 200 includes an E-AGCH decoder 202, an E-RGCH decoder 204 and an SG processor 206. The E-AGCH decoder 202 receives, and decodes, E-AGCH signals 201a received from the serving RLS to detect an AG 205a. The detected AG 205a is sent to the SG processor 206. The E-RGCH decoder 204 receives, and decodes, E-RGCH signals 201b from the serving RLS and E-RGCH signals 201c from the non-serving RL(s) to detect an RG 205b from the serving RLS and an RG 205c from the non-serving RL(s), respectively. The detected RGs 205b, 205c are sent to the SG processor 206. The E-AGCH decoder 202 indicates to the SG processor 206 whether the AG 205a was received with a primary E-RNTI or a secondary E-RNTI. The E-AGCH 202 and the E-RGCH 204 also indicate which sub-frame the scheduling grant (i.e., AG 205a or RG 205b, 205c) was received in.

The SG processor 206 generates a current SG based on the AG and/or the RG. The SG processor 206 includes a first SG calculator 208, a second SG calculator 210 and a controller 212. The first SG calculator 208 receives an AG 205a and an RG 205b from the serving RLS and calculates a first SG candidate 209a. The second SG calculator 210 receives at least one RG 205c from the non-serving RL(s) and calculates a second SG candidate 209b. The controller 212 outputs a new SG 213 based on the first SG candidate 209a and/or the second SG candidate 209b.

When the WTRU 200 is in an idle state, the SG processor 206 may be temporarily turned off for power saving. The latest received secondary AG and the primary AG are saved in a memory (not shown in FIG. 2) and the SG processing resumes when the WTRU 200 is activated and has data for transmission. After resuming the SG processing, the saved latest received secondary AG and the primary AG are processed by the SG processor 206 and a new SG 213 is generated.

The scheduling grant processor 206 provides the amount of power that can be used by a transport format combination (TFC) selection and multiplexing unit (not shown) for scheduled data dedicated channel medium access control (MAC-d) flows. This may be identified as the ratio to the DPCCH power. Alternatively, this may be identified by the maximum transmit power that can be used for scheduled data to avoid the TFC selection and multiplexing unit to be aware of the DPCCH power measurements. The latter method is preferable since other scheduling related entities do not have to know the current DPCCH power.

Figure 3:
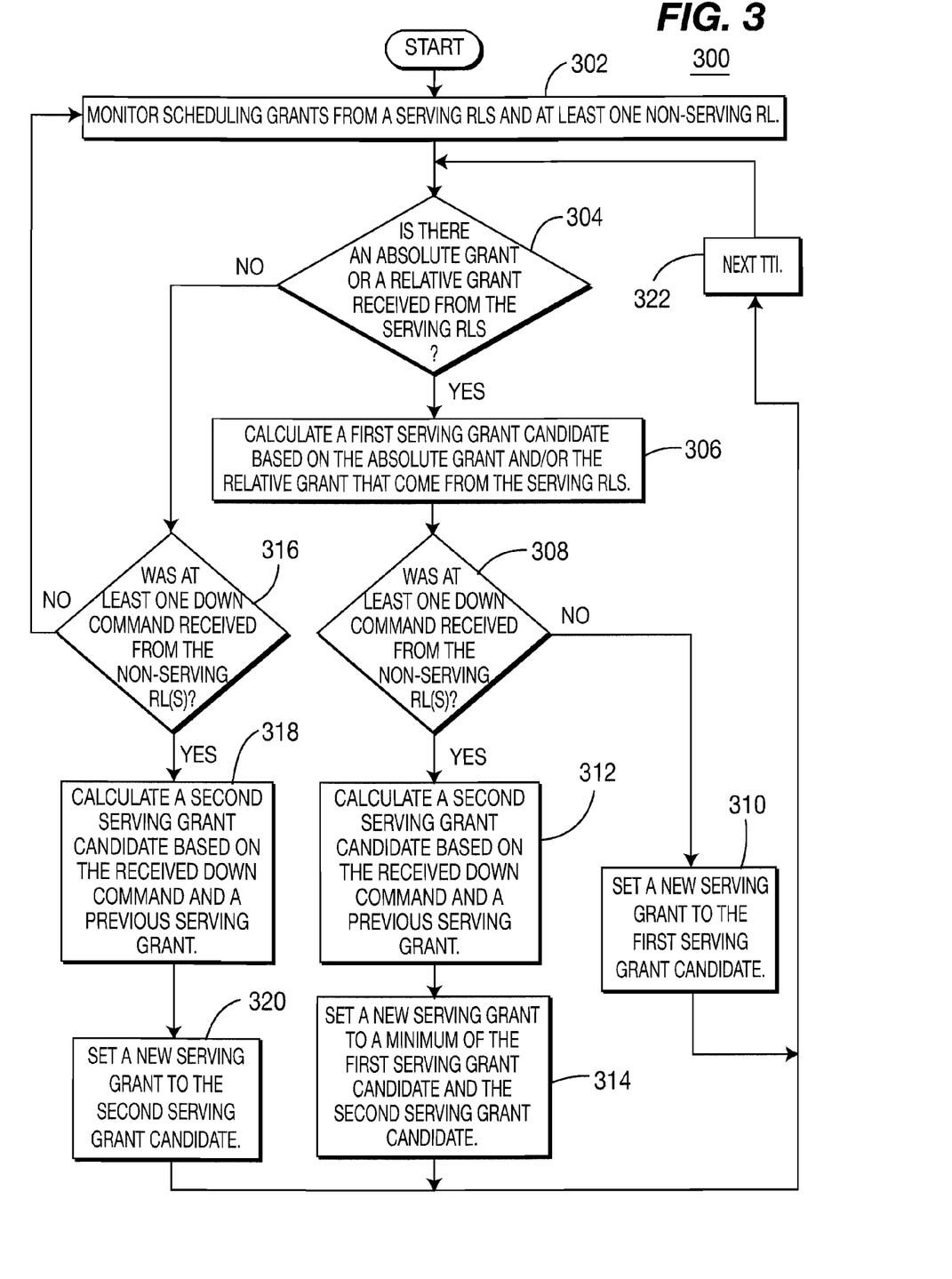
FIG. 3 is a flow diagram of a process of processing SGs in accordance with the present invention.

FIG. 3 is a flow diagram of a process 300 of processing SGs in accordance with the present invention. A WTRU monitors scheduling grants (i.e., an AG and an RG) from a serving RLS and at least one non-serving RL (step 302). It is then determined whether there is an AG or an RG received from the serving RLS (step 304). If there is an AG or an RG received from the serving RLS, a first SG candidate is calculated based on the AG and/or the RG that come from serving RLS (step 306). It is then determined whether there is a DOWN command received from the non-serving RL(s) (step 308). If no DOWN commands are received from the non-serving RL(s), a new SG is set to the first SG candidate (step 310) and the process 300 waits for the next transmission time interval (TTI) at step 322 before proceeding to step 304. If there is a DOWN command received from the non-serving RL(s), a second SG candidate is calculated based on the received DOWN command and a previous SG (step 312). A new SG is then set to a minimum one of the first SG candidate and the second SG candidate (step 314) and the process 300 waits for the next TTI at step 322 before proceeding to step 304. The new SG may be set to the minimum of the first SG candidate and the second SG candidate because the serving cell may reduce the scheduling grant by more than the RG down step size.

If, in step 304, it is determined that there is no AG or RG received from the serving RLS, it is further determined whether there is a DOWN command received from the non-serving RL(s) (step 316). If there is no DOWN command received from the non-serving RL, the process 300 returns to step 302 to monitor the scheduling grants. If there is a DOWN command received from the non-serving RL, a second SG candidate is calculated based on the DOWN command and a previous SG (step 318). A new SG is then set to the second SG candidate (step 320) and the process 300 waits for the next TTI at step 322 before proceeding to step 304.

Figures 4, 4A:
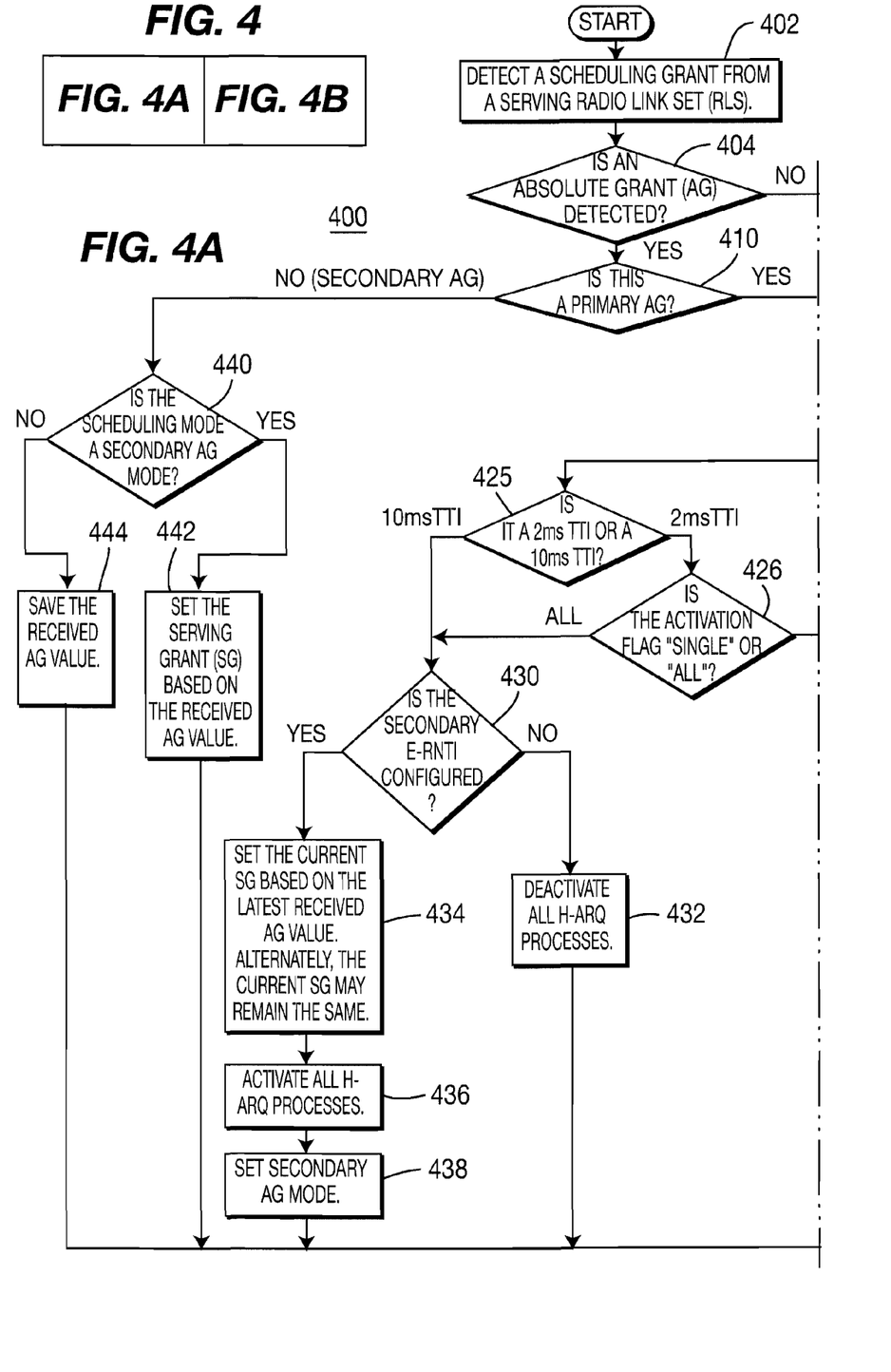
FIGS. 4A and 4B, taken together, are a flow diagram of a process of generating SGs based on scheduling grant from the serving RLS in accordance with one embodiment of the present invention.
Figure 4B:
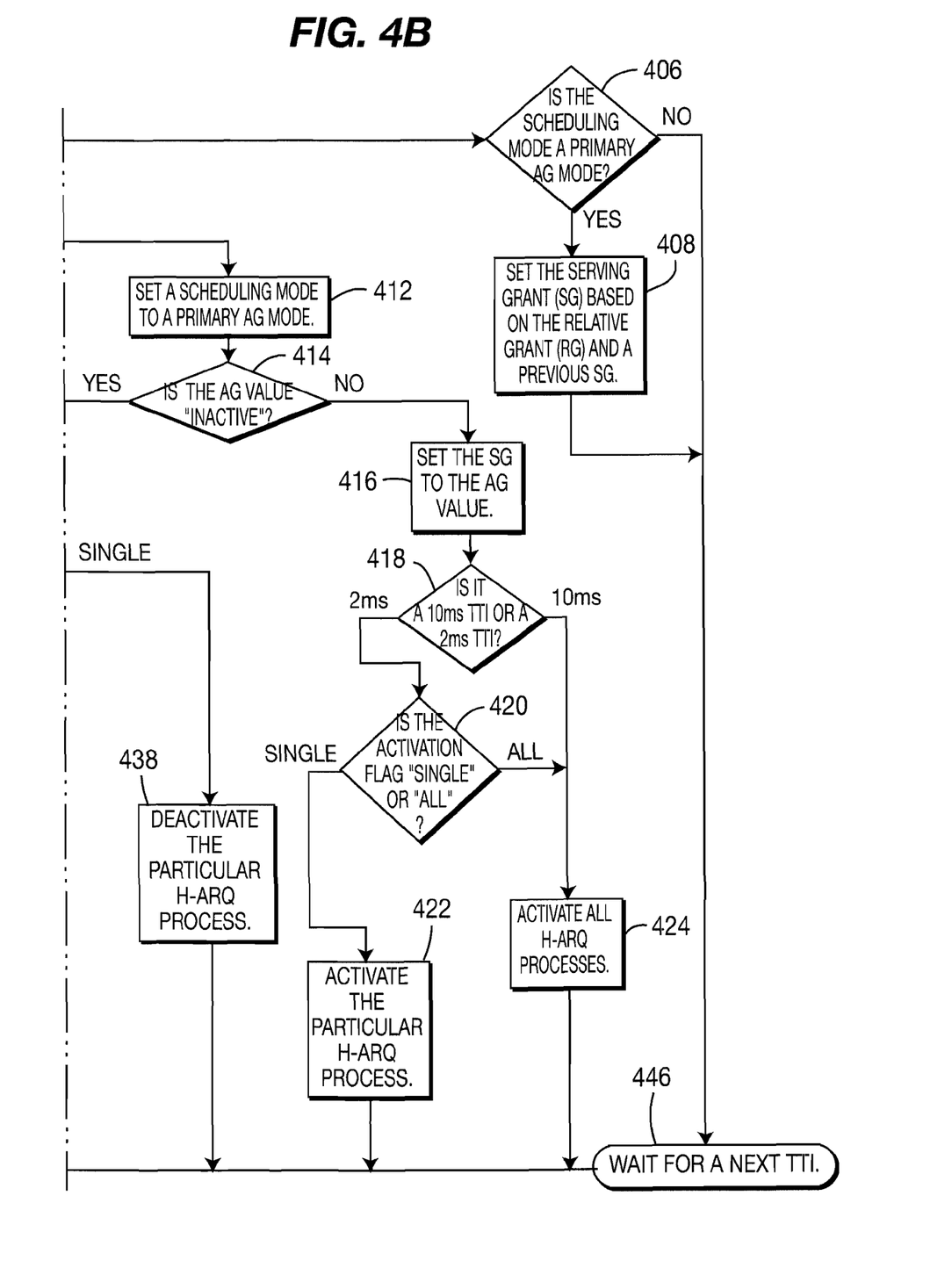

FIGS. 4A and 4B, taken together, are a flow diagram of a process 400 of generating SGs based on a scheduling grant from the serving RLS in accordance with one embodiment of the present invention. A scheduling grant from a serving RLS is detected (step 402). It is determined whether an AG is detected (step 404). If it is determined that an AG is detected, a new SG may be generated and/or an H-ARQ process may become active or inactive depending on whether the received AG is a primary AG or a secondary AG, whether a scheduling mode is a primary AG mode or a secondary AG mode, whether an AG value is set to "INACTIVE" and whether the TTI is 2 ms or 10 ms.

An AG may be either a primary AG or a secondary AG. The primary AG is an AG received with a primary E-RNTI and the secondary AG is an AG received with a secondary E-RNTI. The primary AG always resets the current SG. The secondary AG resets the current SG only if the WTRU is in a secondary AG mode. The WTRU is switched to a secondary AG mode if 1) for 10 ms TTI the AG value of the last primary AG was set to "INACTIVE", and 2) for 2 ms TTI the AG value of the last primary AG was set to "INACTIVE" and the process activation flag was set to "ALL" (therefore, the scheduling mode is transited to a secondary AG mode). If the latest AG that affected the SG was the secondary AG, the WTRU is already in the secondary AG mode.

A primary AG mode is a scheduling mode in which only a primary AG and an RG affect the SG (i.e., a secondary AG does not affect the SG). A secondary AG mode is a scheduling mode in which all of the primary AG, the secondary AG and the RG may affect the SG. When in a primary AG mode, the Node-B controls the resource scheduling for only a particular WTRU using a primary E-RNTI, and when in a secondary AG mode, the Node-B controls the resource scheduling for a group of WTRUs using a secondary E-RNTI. A primary AG whose AG value is set to "INACTIVE" triggers the transition from the primary AG mode to the secondary AG mode.

If, at step 404, it is determined that an AG is not detected, it is further determined whether the scheduling mode is a primary AG mode (step 406). If the scheduling mode is not a primary AG mode (i.e., it is a secondary AG mode), the process 400 proceeds to step 446 to wait for the next TTI. If the scheduling mode is a primary AG mode, the SG is set based on a received RG (it is assumed that an RG is received from the serving RLS), and the SG generated in the previous TTI for the same H-ARQ process (step 408). An RG received from the serving RLS is interpreted relative to the power ratio in the previous TTI for the same H-ARQ process as the transmission which the RG affects. If the RG indicates an UP command, then the SG is obtained by increasing the previous power ratio by the predetermined step size. If the RG indicates a DOWN command, the SG is obtained by decreasing the previous power ratio by the predetermined step size. If the RG indicates a HOLD command, the SG remains unchanged.

If, at step 404, it is determined that an AG is detected, it is further determined whether the AG is a primary AG or a secondary AG (step 410). If the AG is a primary AG, the scheduling mode is set to the primary AG mode (step 412). It is then further determined whether the AG value of the detected AG is set to "INACTIVE" (step 414). If the AG value is not set to "INACTIVE" (i.e., the AG value is set to a non-zero value), the SG is updated to the received AG value (step 416). It is then determined whether the TTI is 2 ms or 10 ms (step 418). If the TTI is 10 ms, all the H-ARQ processes are activated (step 424) and the process 400 proceeds to step 446 to wait for the next TTI.

If the TTI is 2 ms, it is further determined whether the activation flag is set to "SINGLE" or "ALL" (step 420). If the activation flag is set to "SINGLE", the particular H-ARQ process is activated (i.e., if the particular H-ARQ process is inactive, the H-ARQ process becomes active, and if the H-ARQ process is active, the H-ARQ process remains active) (step 422). If the activation flag is set to "ALL", all H-ARQ processes are activated (i.e., inactive H-ARQ processes becomes active and active H-ARQ processes remain active) (step 424). An active process is an H-ARQ process for which scheduled data may be sent and an inactive process is an H-ARQ process for which non-scheduled data may be sent.

If, at step 414, it is determined that the AG value of the received AG is set to "INACTIVE", it is further determined whether it is 2 ms or 10 ms TTI (step 425). If it is 2 ms TTI, it is further determined whether the activation flag is set to "SINGLE" or "ALL" (step 426). If the activation flag is set to "SINGLE", only the particular H-ARQ process becomes inactive (step 428). If the activation flag is set to "ALL", it is further determined whether a secondary E-RNTI is configured (step 430). If it is determined at step 425 that it is 10 ms TTI, the process 400 proceeds to step 430. If the secondary E-RNTI is not configured, all H-ARQ processes are deactivated (step 432). If the secondary E-RNTI is configured, the current SG may be updated to the latest received AG value (step 434) (which will be explained in detail with reference to FIGS. 5A-5C). Alternatively, the SG value may not be changed and the previous SG value may remain the same. In such case, the step 434 is bypassed and the process 400 proceeds to step 436. All H-ARQ processes are then activated and the scheduling mode is set to the secondary AG mode (steps 436, 438).

If, at step 410, it is determined that the AG is not a primary AG (i.e., the AG is a secondary AG), it is further determined whether the scheduling mode is a secondary AG mode (step 440). If the scheduling mode is the secondary AG mode (therefore, the secondary AG may affect the current SG), the current SG is set based on the AG value of the received AG (step 442). If the scheduling mode is not a secondary AG mode, (therefore, the secondary AG may not affect the current SG), the AG value of the received AG is saved in a memory and may be used later (which will be explained in detail with reference to FIGS. 5A-5C) (step 444).

Figure 5A:
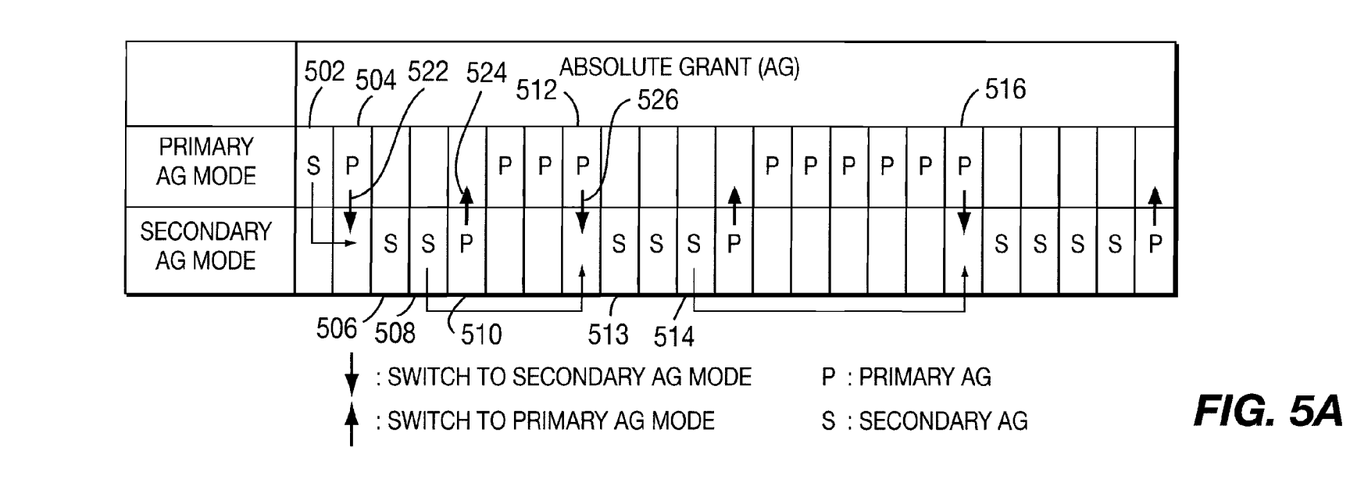
FIGS. 5A-5C illustrates transmission and reception for AGs and processing SGs in accordance with the present invention.
Figure 5B:
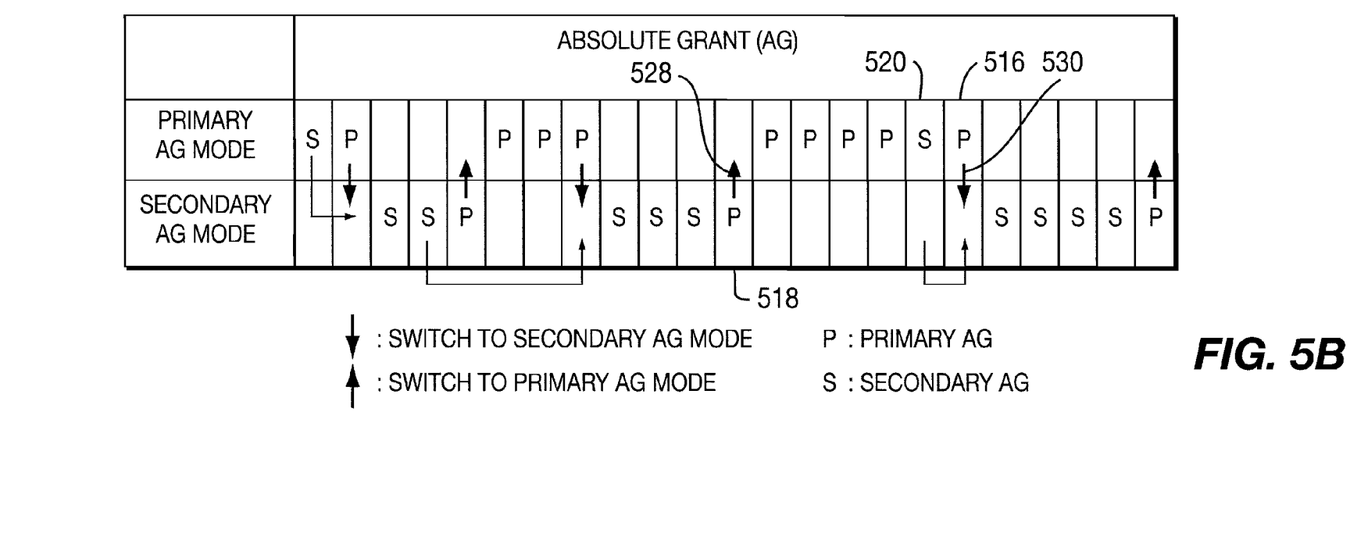
Figure 5C:
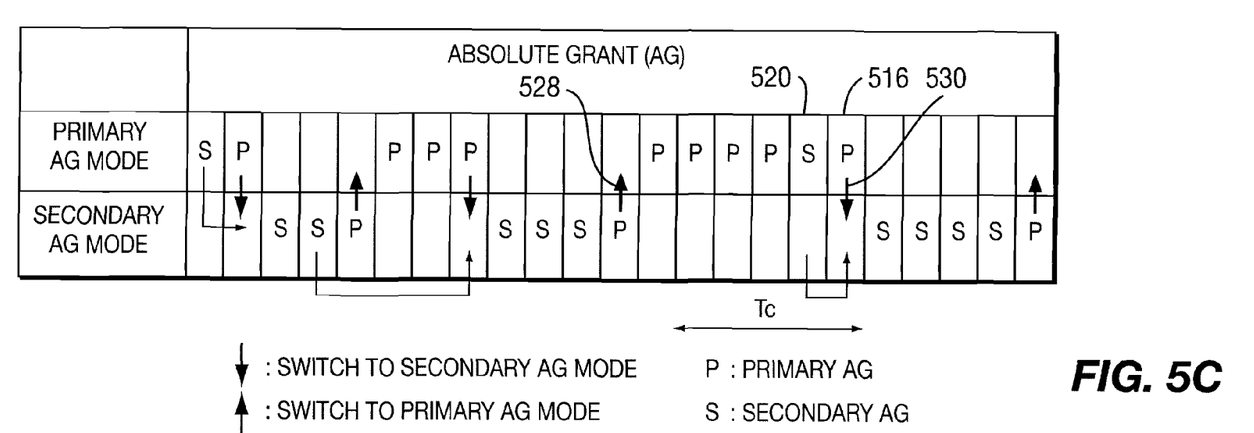

FIGS. 5A-5C illustrate exemplary Node-B scheduling with a primary AG and a secondary AG in accordance with the present invention. A Node-B transmits either a primary AG or a secondary AG to the WTRU. The scheduling grant mode switches between a primary AG mode and a secondary AG mode. The primary AG always resets the current SG. The secondary AG only affects the current SG if the current scheduling mode is set to a secondary AG mode (i.e., when the last primary AG triggers the transition to the secondary AG mode), or if the latest AG that affected the SG was the secondary AG. Hereinafter, it is assumed that the initial state is a primary AG mode. However, the present invention is equally applicable to the case when the initial configuration is in a secondary AG mode.

Referring to FIG. 5A, a Node-B first sends a secondary AG 502. Since the current scheduling mode is a primary AG mode, the AG value in the received secondary AG 502 is saved. The next AG is a primary AG 504 with an AG value set to "INACTIVE." This triggers a transition from the primary AG mode to the secondary AG mode as indicated by a down arrow 522.

When the scheduling mode is switched from the primary AG mode to the secondary AG mode, the SG may remain the same as the previous SG in the transition period of scheduling mode switching and the SG is updated when the next AG (in this case AG 506) is received. Alternatively, the SG may be set to the latest received and saved secondary AG value (in this example, the AG 502) in transition period of scheduling mode switching to avoid the delay of SG update.

The next two AGs 506, 508 are secondary AGs and the SG is updated with the AG values of the secondary AGs 506, 508, respectively. The next AG is a primary AG 510. The receipt of a primary AG while in a secondary AG mode triggers a transition back to the primary AG mode as indicated by an up arrow 524.

After two primary AGs are sent, a primary AG 512 with the AG value set to "INACTIVE" is received. This triggers switch of the scheduling mode back to the secondary AG mode as indicated by a down arrow 526 and the SG may remain the same and updated when the next secondary AG (in this example, the AG 513) is received. Alternatively, the SG may be updated with the latest secondary AG (in this example, the AG 508) in the scheduling mode transition period to avoid the delay of SG update.

A potential problem is that the last saved secondary AG value may be out-of-date when the system stays in a primary AG mode for too long. For example, when the WTRU receive a primary AG 516, the system has stayed in a primary AG mode for 6 TTIs and the last secondary AG 514 may be out-of-date.

FIG. 5B shows another exemplary Node-B scheduling with a primary AG and a secondary AG in accordance with the present invention. In this embodiment, the Node-B sends a secondary AG right before switching to the secondary AG mode. In FIG. 5B, the transmission sequence of AGs is same to the case in FIG. 5A, except the Node-B sends a secondary AG 520 just before sending the primary AG 516. The scheduling mode has been switched from the secondary AG mode to the primary AG mode as indicated by an up arrow 528 when the primary AG 518 is received. The Node-B sends the secondary AG 520 just before switching the scheduling mode to the secondary AG mode (i.e., just before sending a primary AG 516 with an AG value set to "INACTIVE"). The AG value in the secondary AG 520 is saved and used when the scheduling mode is switched to the secondary AG mode as indicated by a down arrow 530 when the primary AG 516 is received. With this scheme, an out-of-date secondary AG may be avoided.

Alternatively, the Node-B may use a time threshold to detect an out-of-date problem as shown in FIG. 5C. The Node-B determines just before switching the scheduling mode from the primary AG mode to the secondary AG mode whether the out-of-date situation exists (i.e., whether there was any secondary AG transmitted in the time threshold from the switching point). If there was any secondary AG transmitted during the time threshold, the Node-B sends the primary AG 516 without sending the secondary AG 520. However, if there was no secondary AG transmitted during the time period, (as shown in FIG. 5C), the Node-B sends the secondary AG 520 before sending the primary AG 516.

The time threshold may be implemented as a static value. Alternatively, the time threshold may be semi-statically or dynamically adjusted depending on several factors including, but not limited to, a traffic condition change rate, an interference condition variation rate, vehicle speed, or the like. If the traffic condition or interference condition change rapidly, the time threshold is adjusted to reflect the environment changes.

Figure 6:
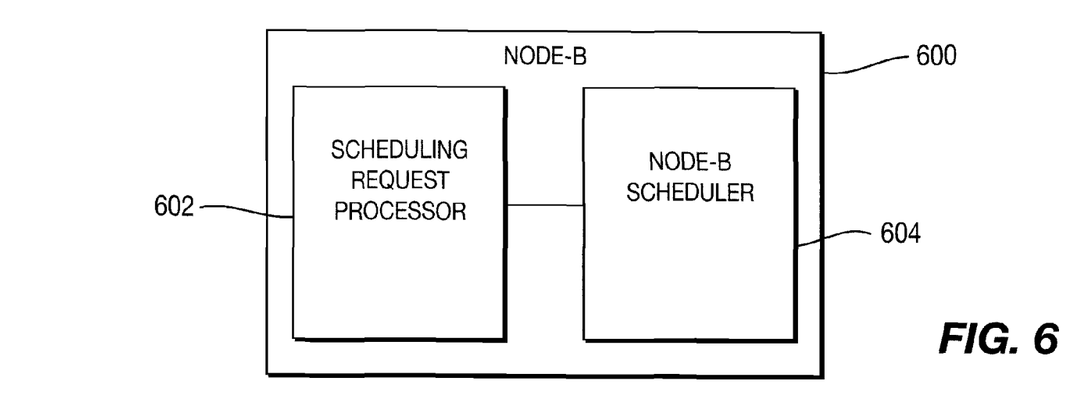
FIG. 6 is a block diagram of a Node-B configured in accordance with the present invention.

FIG. 6 is a block diagram of a Node-B 600 configured in accordance with the present invention. The Node-B 600 includes a scheduling request processor 602 and a Node-B scheduler 604. The scheduling request processor 602 is configured to receive and process scheduling information received from a WTRU. The Node-B scheduler 604 is configured to control resource scheduling by sending a primary AG and a secondary AG to a WTRU. The Node-B scheduler 604 controls resource scheduling for only a particular WTRU in a primary AG mode and control resource scheduling for a group of WTRUs in a secondary AG mode.

In the case when the SG is set to the latest received and saved secondary AG value in transition period of scheduling mode switching in the WTRU, the Node-B scheduler 604 sends a secondary AG before switching a scheduling mode from a primary AG mode to a secondary AG mode as explained hereinabove. The Node-B scheduler 604 determines whether an out-of-date secondary AG exists before switching a scheduling mode from the primary AG mode to the secondary AG mode and switches the scheduling mode only if there is no out-of-date secondary AG exists. The Node-B scheduler 604 determines the existence of the out-of-date secondary AG by implementing a time threshold, which may be static or dynamically adjusted based on a predetermined factor.

Figures 7, 7A:
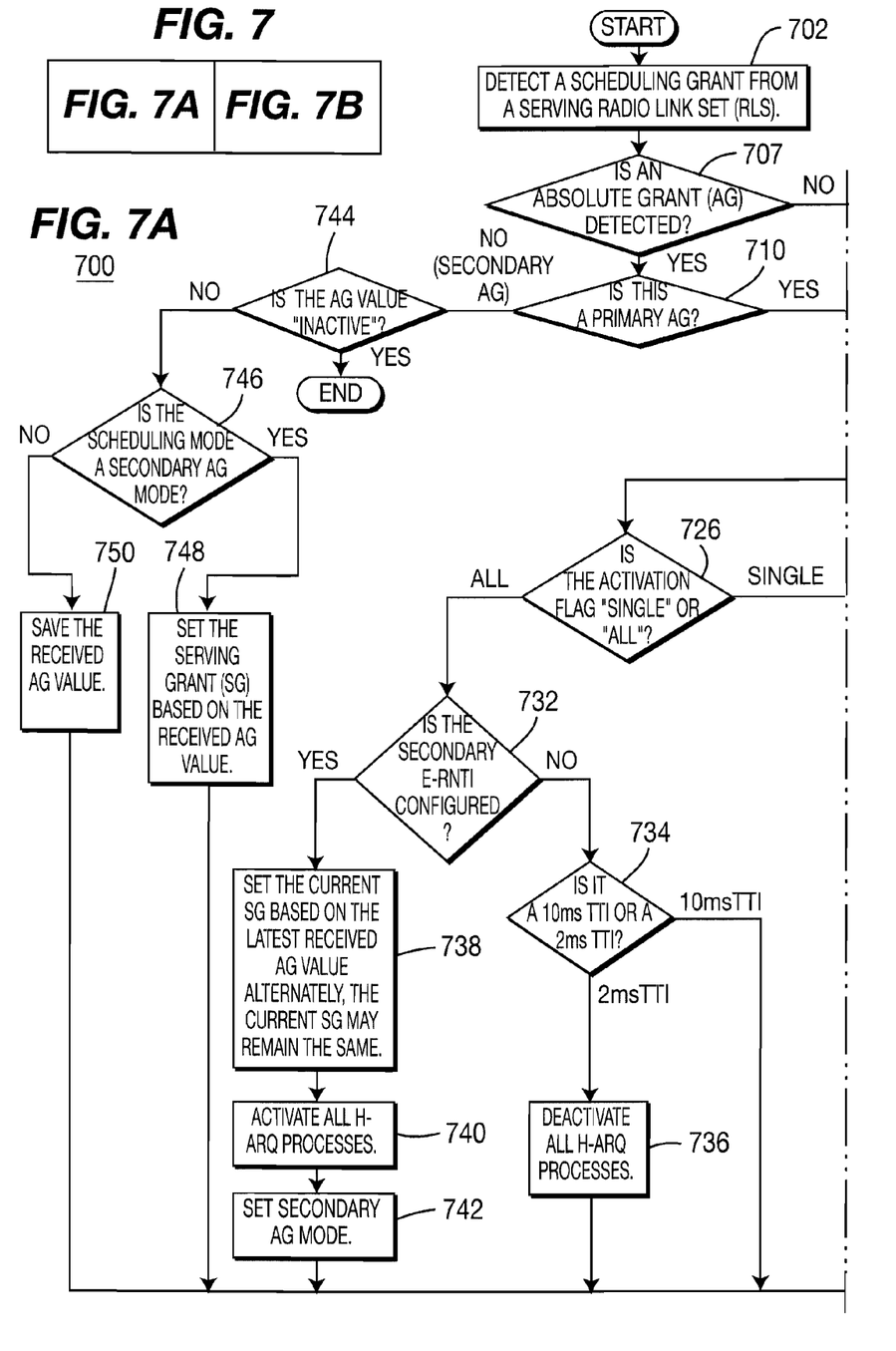
FIGS. 7A and 7B, taken together, are a flow diagram of a process of generating SGs based on scheduling grant from the serving RLS in accordance with another embodiment of the present invention.
Figure 7B:
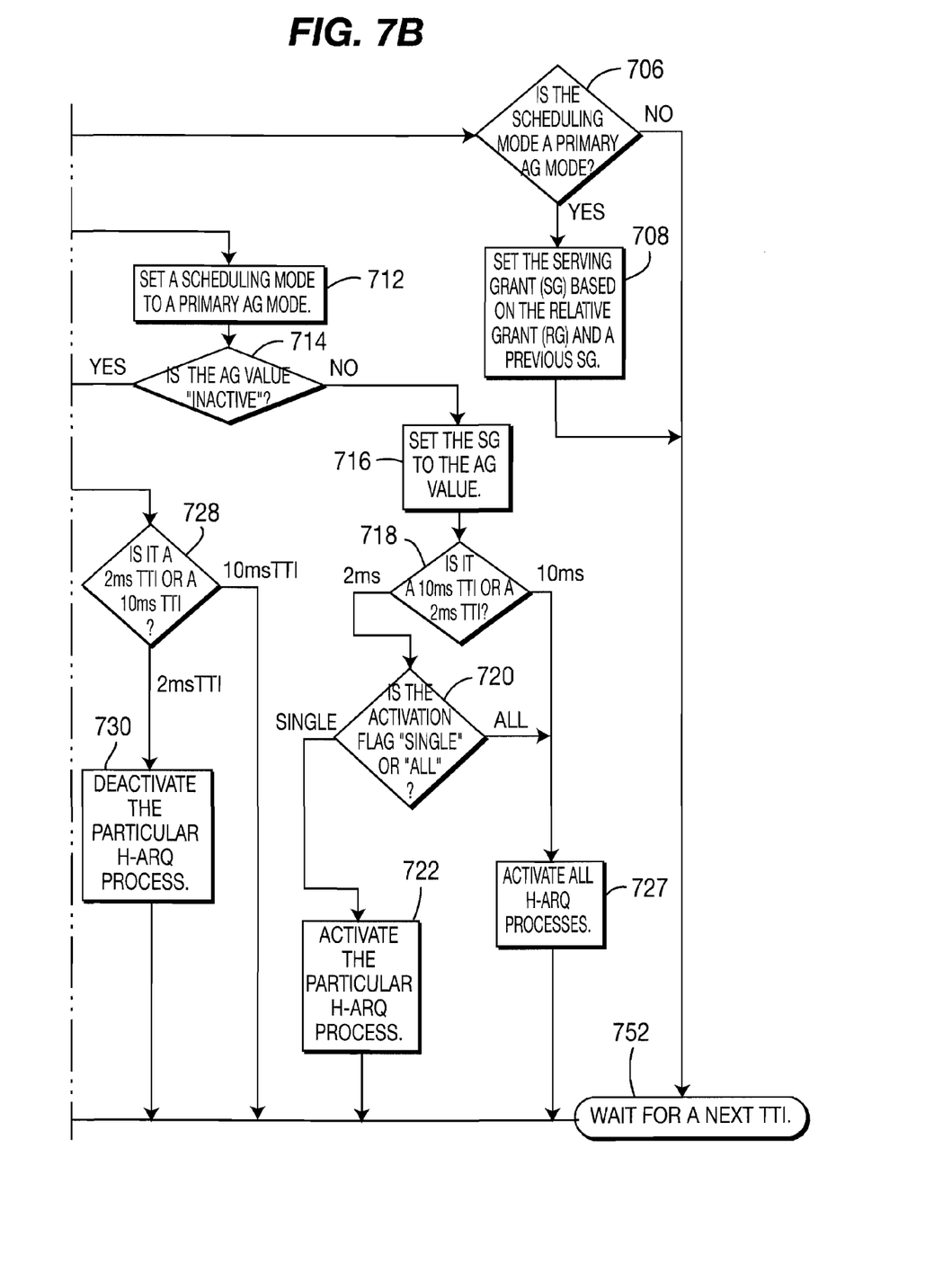

FIGS. 7A and 7B, taken together, are a flow diagram of a process 700 of generating SGs based on scheduling grant from the serving RLS in accordance with another embodiment of the present invention. The steps 702-724 are identical to the steps 402-424 in FIG. 4A and therefore will not be repeated herein. If, at step 714, it is determined that the AG value of the received AG is set to "INACTIVE", it is further determined whether the activation flag is set to "SINGLE" or "ALL" (step 726). If the activation flag is set to "SINGLE", it is further determined whether it is 2 ms TTI or 10 ms TTI (step 728). If it is 2 ms TTI, only the particular H-ARQ process becomes inactive (step 730). If it is 10 ms TTI, there is no change and the process 700 proceeds to step 752 to wait for the next TTI.

If, at step 726, it is determined that the activation flag is set to "ALL", it is further determined whether a secondary E-RNTI is configured (step 732). If the secondary E-RNTI is not configured, it is further determined whether it is 2 ms TTI or 10 ms TTI (step 734). If it is 2 ms TTI, all H-ARQ processes are deactivated (step 736). If it is 10 ms TTI, there is no change and the process 700 proceeds to step 752 to wait for the next TTI.

If, at step 732, it is determined that the secondary E-RNTI is configured, the current SG may be updated to the latest received AG value (step 738) (as explained with reference to FIGS. 5A-5C). Alternatively, the SG value may not be changed and the previous SG value may remain the same. In such case, the step 738 is bypassed and the process 700 proceeds to step 740. All H-ARQ processes are then activated and the scheduling mode is set to the secondary AG mode (steps 740, 742).

If, at step 710, it is determined that the AG is not a primary AG (i.e., the AG is a secondary AG), it is further determined whether the AG value is set to "INACTIVE" (step 744). If the AG value is not set to "INACTIVE", it is further determined whether the scheduling mode is a secondary AG mode (step 746). If the scheduling mode is the secondary AG mode, (therefore, the secondary AG may affect the current SG), the current SG is set based on the AG value of the received AG (step 748). If the scheduling mode is not a secondary AG mode, (therefore, the secondary AG may not affect the current SG), the AG value of the received AG is saved in a memory and may be used later, (as explained in detail with reference to FIGS. 5A-5C) (step 750).

Although the features and elements of the present invention are described in the preferred embodiments in particular combinations, each feature or element can be used alone without the other features and elements of the preferred embodiments or in various combinations with or without other features and elements of the present invention.

What is claimed is:

1. A method for generating a serving grant (SG) at a wireless transmit/receive unit (WTRU), comprising:

decoding an absolute grant channel (AGCH) signal to obtain an absolute grant (AG) from a serving cell;

decoding a relative grant channel (RGCH) signal to obtain a relative grant (RG) from a serving radio link set (RLS) and an RG from a non-serving radio link (RL);

generating a first SG candidate based on at least one of: the AG from the serving cell or the RG from the serving RLS;

generating a second SG candidate based on the RG from the non-serving RL; and generating the SG based on the first SG candidate and the second SG candidate.

2. The method of claim 1, wherein the RG is one of: an UP command to increase a previous SG by a predetermined step size, a DOWN command to decrease the previous SG by a predetermined step size, or a HOLD command to maintain the previous SG.

3. The method of claim 1, further comprising:
determining whether the AG is a primary AG or a secondary AG;
on a condition that the AG is a primary AG, determining whether an AG value in the AG is "INACTIVE"; and
on a condition that the AG value is not "INACTIVE", setting the SG with the AG value.

4. The method of claim 3, further comprising:
determining whether a transmission time interval (TTI) is 10 ms or 2 ms;
on a condition that the TTI is 10 ms, activating all hybrid automatic repeat request (H-ARQ) processes;
on a condition that the TTI is 2 ms, further determining whether an activation flag in the AG is "SINGLE" or "ALL";
on a condition that the activation flag is "SINGLE", activating a particular H-ARQ process; and
on a condition that the activation flag is "ALL", activating all H-ARQ processes.

5. The method of claim 3, further comprising:
on a condition that the AG value is "INACTIVE", further determining whether a transmission time interval (TTI) is 2 ms or 10 ms;
on a condition that the TTI is 2 ms, further determining whether an activation flag in the AG is "SINGLE" or "ALL"; and
on a condition that the activation flag is "SINGLE", deactivating a particular H-ARQ process.

6. The method of claim 5, further comprising:
on a condition that the TTI is 10 ms or the activation flag is "ALL", further determining whether a secondary radio network temporary identity (RNTI) is configured;
on a condition that the secondary RNTI is not configured, deactivating all H-ARQ processes; and
on a condition that the secondary RNTI is configured, activating all H-ARQ processes, and setting a secondary AG mode.

7. The method of claim 6, further comprising:
on a condition that the secondary RNTI is configured, setting the SG based on a latest received AG value.

8. The method of claim 3, further comprising:
on a condition that the AG is a secondary AG, determining whether a scheduling mode is a secondary AG mode;
on a condition that the scheduling mode is a secondary AG mode, setting the SG based on the AG value; and
on a condition that the scheduling mode is not a secondary AG mode, saving the AG value.

9. The method of claim 3, further comprising:
on a condition that the AG value is "INACTIVE", further determining whether an activation flag is "SINGLE" or "ALL";
on a condition that the activation flag is "SINGLE", further determining whether a transmission time interval (TTI) is 10 ms or 2 ms,
on a condition that the TTI is 10 ms, waiting for a next TTI, and
on a condition that the TTI is 2 ms, deactivating a particular hybrid automatic repeat request (H-ARQ) process.

10. The method of claim 9, further comprising:
on a condition that the activation flag is "ALL", further determining whether a secondary radio network temporary identity (RNTI) is configured;
on a condition that the secondary RNTI is not configured, further determining whether a TTI is 10 ms or 2 ms;
on a condition that the TTI is 10 ms, waiting for a next TTI;
on a condition that the TTI is 2 ms, deactivating a particular hybrid automatic repeat request (H-ARQ) process; and
on a condition that the secondary RNTI is configured, activating all H-ARQ processes and setting a secondary AG mode.

11. The method of claim 10, further comprising:
on a condition that the secondary RNTI is configured, setting the SG based on a latest received AG value.

12. The method of claim 3, wherein the serving cell sends a secondary AG before switching a scheduling mode from a primary AG mode to a secondary AG mode.

13. The method of claim 3, wherein the serving cell sends a secondary AG before switching a scheduling mode from a primary AG mode to a secondary AG mode on a condition that there is an out-of-date secondary AG.

14. The method of claim 13, wherein the serving cell determines the existence of the out-of-date secondary AG by implementing a time threshold.

15. The method of claim 14, wherein the time threshold is static.

16. The method of claim 14, wherein the time threshold is dynamically adjusted based on a predetermined factor.

17. The method of claim 16, wherein the predetermined factor includes at least one of: a traffic condition change rate, an interference condition variation rate, or vehicle speed.

* * * * *

UNITED STATES PATENT AND TRADEMARK OFFICE
CERTIFICATE OF CORRECTION

| | | |
|---|---|---|
| PATENT NO. | : 7,792,077 B2 | Page 1 of 1 |
| APPLICATION NO. | : 12/570005 | |
| DATED | : September 7, 2010 | |
| INVENTOR(S) | : Pan et al. | |

It is certified that error appears in the above-identified patent and that said Letters Patent is hereby corrected as shown below:

ON THE TITLE PAGE item (63), RELATED U.S. APPLICATION DATA, page one, left column, line 2 delete "7,163,157" and insert therefor --7,613,157--.

Signed and Sealed this

Third Day of May, 2011

David J. Kappos
*Director of the United States Patent and Trademark Office*